Patented Sept. 18, 1928.

1,684,852

UNITED STATES PATENT OFFICE.

A. BENJAMIN WERBY, OF NEWTON, MASSACHUSETTS, ASSIGNOR TO AMERICAN AUTOMOTIVE CORPORATION, OF BOSTON, MASSACHUSETTS, A CORPORATION OF DELAWARE.

ELECTROLYTE FOR STORAGE BATTERIES.

No Drawing.    Application filed June 5, 1928.  Serial No. 283,133.

My invention relates to the electrolyte for accumulator cells, or storage batteries, of the type employing lead plates, together with sulphuric acid as an electrolyte.

The object of my invention is to provide an electrolyte which will permit the cell to be more rapidly charged than is the case in common practice, and which will also enable it to retain its charge longer, thereby rendering the battery better adapted for severe service conditions which may be encountered, without damage to the cell.

It is well known that when the usual lead and sulphuric acid cell is discharged, the sulphate of lead formed during the discharge is insoluble and remains fixed on the plates where it is formed, so that when the discharge of the cell occurs too rapidly, due to severe service conditions, the cell plates are buckled and permanently injured. Such severe conditions are frequently encountered when cells are used for automobile starting, lighting, and ignition, and it is one of the objects of my invention to provide an electrolyte that is particularly suited for this kind of service, and which will function without giving rise to such troubles.

In carrying out my invention, there is added to the ordinary sulphuric acid electrolyte, which I will call the primary electrolyte, of the ordinary lead plate cell, a secondary or auxiliary electrolyte, which consists of a solution of a salt or salts of an organic acid, preferably with soluble inorganic salts. The presumable action of this auxiliary electrolyte is to form with the ions of the primary electrolyte, more complex ions which retard the formation of the lead sulphate formed in the primary electrolyte or render it somewhat soluble. The reason for assuming the formation of complex ions or solvent action on lead sulphate, as the explanation for the action of my auxiliary electrolyte, is that certain substances are found essential to it, that have the property of dissolving in their aqueous solution considerable quantities of the normally insoluble lead sulphate. Such substances are the alkali salts of acetic or tartaric acids, i. e., ammonium, sodium, and potassium salts, preferably ammonium acetate. By the use of the auxiliary electrolyte, containing such substances, the cell retains its charge longer, and furthermore, will carry a heavy load without exhibiting any damage to its plates, such as has been encountered in previous cells due to excessive action accompanying too rapid discharge. The cell will, moreover, charge with great rapidity, and even before charging set up an electrical current sufficient to make the battery fit for use in an autotmobile, even in the case of a new battery into which the improved electrolyte is first introduced.

In the course of my experimental work, I have found that several combinations of soluble substances will produce the desired results for an auxiliary electrolyte, to be used in combination with the ordinary sulphuric acid electrolyte, provided there is present some salt, the aqueous solution of which has the the solvent action I have described on lead sulphate. Thus, I have used for my auxiliary electrolyte, solutions containing sodium chloride or sulphate, magnesium chloride or sulphate, and potassium chloride or sulphate, but preferably the sulphates, either alone or in combination, but always including in the combination an acetate of an alkaline metal.

The explanation of the functions and advantages arising out of the inclusion of the above-named soluble inorganic salts is not entirely clear. It is probably simply a phenomenon of concentration, i. e., if it were practical to use a high concentration of the salt of an inorganic acid, it would probably act as efficiently as this salt, in small quantities, does in the presence of soluble inorganic salts; on the other hand the presence of these soluble inorganic salts may cause local depression of the ionization of the sulphuric acid so that the formation of complex ions is increased.

Assuming my explanation of the formation of a complex ion as the correct reason for this action of the acetates as providing a secondary electrolyte which increases the efficiency of a battery, then it is suggested that equivalents for the acetates above-mentioned are found in salts of other organic acids of similar character, such as tartrates, formates, propionates and lactates.

In carrying out my invention, the quantity and proportions of the above-named soluble substances may be considerably varied to obtain the results desired. As a specific formula for carrying out my invention, I replace three ounces of the quantity of ordinary sulphuric acid electrolyte employed in the cell of a 6-volt storage battery with three ounces of a solution containing five parts ammonium acetate, two parts potassium sulphate, eight parts magnesium sulphate, five parts sodium sulphate, and 50 parts of water. As I have stated, however, the formula may be widely varied as to relative proportions of ingredients of the auxiliary electrolyte. The best results are obtained by using initially as the primary electrolyte, a sulphuric acid of specific gravity of 1.4, commonly known as fourteen hundred electrolyte.

Having thus fully described my invention, what I claim is:

1. An electrolyte for storage batteries which includes sulphuric acid, water, and ammonium acetate.

2. An electrolyte for storage batteries which includes sulphuric acid, water, ammonium acetate, and a soluble inorganic salt such as sodium sulphate.

3. An electrolyte for storage batteries which includes sulphuric acid, water, ammonium acetate, potassium sulphate, magnesium sulphate, and sodium sulphate.

4. An electrolyte for storage batteries which includes sulphuric acid, water, and the ammonium salt of an organic acid of the nature specified.

5. An electrolyte for storage batteries which includes sulphuric acid, water, and the alkali salt of an organic acid of the nature specified.

6. An electrolyte for storage batteries which includes sulphuric acid, and ammonium salt of an organic acid of the nature specified and a soluble inorganic salt of the nature specified.

7. An electrolyte for storage batteries which includes sulphuric acid, water, the alkali salt of an organic acid of the nature specified and a soluble inorganic salt of the nature specified.

A. BENJAMIN WERBY.